(12) United States Patent
Bentley

(10) Patent No.: US 6,568,303 B1
(45) Date of Patent: May 27, 2003

(54) METHOD AND APPARATUS FOR CUTTING RINGS FROM RING FORGINGS

(76) Inventor: Richard Bentley, 6925 Aragon Cir., Unit 30, Buena Park, CA (US) 90620

( * ) Notice: Subject to any disclaimer, the term of this patent is extended or adjusted under 35 U.S.C. 154(b) by 0 days.

(21) Appl. No.: 10/128,913

(22) Filed: Apr. 23, 2002

(51) Int. Cl.[7] .............................. B23B 1/00; B23B 5/14
(52) U.S. Cl. ................................ 82/47; 82/123; 82/158
(58) Field of Search .............................. 82/46, 47, 1.11, 82/123, 114, 56, 91, 100, 101, 113, 120, 121, 138, 158, 161, 173; 407/66, 68, 69, 70

(56) References Cited

U.S. PATENT DOCUMENTS

| | | | | |
|---|---|---|---|---|
| 4,018,112 A | * | 4/1977 | Heaton et al. | 82/1.11 |
| 4,233,867 A | * | 11/1980 | Zimmerman | 82/158 |
| 5,031,492 A | * | 7/1991 | Zinner | 82/158 |
| 5,272,945 A | * | 12/1993 | Lockard | 82/1.11 |

FOREIGN PATENT DOCUMENTS

GB           2085333 A   *   4/1982   ........... B23B/27/16

* cited by examiner

Primary Examiner—Henry W. H. Tsai
(74) Attorney, Agent, or Firm—David A. Belasco; Belasco Jacobs & Townsley, LLP

(57) ABSTRACT

A method and apparatus for cutting rings from ring forgings of titanium or related materials is described. The ring forging is gripped and rotated about its centerline in a centering chuck. A tool holder is mounted parallel to and spaced from the centerline of the forging. The displacement of the tool holder is controlled both along and perpendicular to the centerline. First and second cutter bars having first and second cutter bits are mounted to the tool holder. The first cutter bar is mounted so that it may be moved along a diameter of the ring forging with the second cutter bar moving along a line parallel to, coplanar with and spaced from this diameter. The second cutter bit is wider than the first cutter bit. The second cutter bit widens the cut made by the first cutter bit, thereby providing chip clearance and cooling for the ring being cut.

8 Claims, 5 Drawing Sheets

METHOD AND APPARATUS FOR CUTTING RINGS FROM RING FORGINGS

FIELD OF THE INVENTION

The invention pertains to metal cutting machines and methods. More particularly, the invention relates to machines that designed to divide ring forgings made of titanium and related materials into precision measured ring sections for further processing.

BACKGROUND OF THE INVENTION

Titanium and related materials are typically used for the manufacture of aircraft engine parts and other high-stress, high-temperature applications. These materials are necessarily difficult to cut or machine and tend to be expensive so it is desirable that waste should be minimized. These materials cannot be cut effectively using abrasive cut-off wheels or saws and managing the heat and waste material produced in typical dividing operations can be problematical. Cutting procedures that involve a machine lathe and an orthogonally mounted cutter bar tend to bind as the cut into the rotating ring forging becomes deeper. Further, heating of the ring forging and the tool also increases as the cut becomes deeper, affecting the accuracy of the cut. Also as the cut becomes deeper, it becomes more difficult to clear the chip stream from the area of the cut, further causing binding and possible tool breakage or damage to the rings being cut. It is often desirable to divide a piece of ring forging of such material into nearly identical size ring sections for further forging or machining. If the ring sections can be identically sized and a minimum of material lost in the cutting, the process will be more economical.

U.S. Pat. No. 5,806,386 issued to Risse, is directed to a parting off tool for a lathe having a cutting edge and a rubbing pad. The tool body, a planar plate of stainless steel or the like, has its base located within a tool holder or post. A cutting tip is located on the working edge and has a short sharp edge parallel to the axis of piece. A cutting gap is an interruption in the continuity of the working edge and leads into a chip clearance area that is an aperture completely through the thickness of tool body. Across the cutting gap from the cutting tip a rubbing pad is located. The rubbing pad may be a polished hardened removable attachment or simply may be a length of the working edge.

U.S. Pat. No. 4,452,112, issued to Alexander describes a method of parting metallic rings in which the vibrations generated during heavy-duty operations are minimized by the additional step of supporting the tool holder with side plates. The parting tool, an indexable and disposable insert, has a bore through its center for receiving a fastener that also is received by a shim seat that is seated upon tool holder. The tool holder has side plates to support the tool holder from vibrations due to the extremely high pressures generated in the parting of very large rings. The parting tool engages the surface of the rotating ring below the horizontal plane of the center of rotation.

U.S. Pat. No. 4,052,822 issued to Obear is directed to a method and apparatus for abrasively cutting objects by making a score cut with a previously used worn down abrasive cutting wheel. The abrasive sawing machine has a main frame with a saw housing which positions a large saw or cutting wheel and a smaller saw or cutting wheel for engagement with a metal object, such as a billet to be cut. The large cutting wheel is mounted on an arbor and is used as the main cutting wheel until its diameter is worn down and it becomes less efficient for cutting and is limited in size of the billets that can effectively be cut. The used wheel is then employed as the smaller cutting wheel for making the initial scoring cut. The smaller wheel is provided with an arbor that is located diametrically opposite the larger wheel providing maximum clearance between the wheels as they begin to approach one another while simultaneously cutting the billet.

The smaller cutting wheel, though of the same thickness as the larger wheel, is much more rigid and thus does not skid along the surface of the billet during the initial scoring cut. The small wheel is rotated in the opposite direction of that of the billet to provide a preferred cutting for accurate alignment of the scoring cut while recognizing that a dressing type wear will occur with shorter life. Once the scoring cut is made sufficiently deep, the larger cutting wheel is moved into engagement within the scoring cut. The larger wheel rotates in a direction similar to that of the billet, which is the preferred direction for maximum wearing life of the wheel.

U.S. Pat. No. 4,549,678 issued to Fuminier, discloses a method and apparatus for separating a cut tube end from a work piece to avoid the risk of the end damaging the cutting tool. During the cutting operation, the tool mills a circular groove in the wall of the tube. As tool starts the groove, a jack drives a separator roller in the direction of the groove and a wedge enters the groove with the roller centering itself on the groove. After the cut end is separated, a support arm receives it and stops its fall. The separator apparatus prevents the cut end from falling onto the edge of cutting tool, and damaging it.

U.S. Pat. No. 4,302,958 issued to Andriessen et al., is directed to a parting off rolling tool having three rollers. The parting off tool has a main tool head and a second tool head. The main tool head has a part off rolling tool and a further tool that is a grooving tool of smaller diameter having a V-shaped working surface. The second tool head has only a rolling tool. As the rolling tools and advance through the tube stock, the grooving tool reaches the surface of the tube stock so that by the time the parting groove is completed, the grooving tool has formed a substantially V-shaped circumferential locating groove that is spaced axially from groove by the center-to-center distance L. As the tube stock is advanced for the next cut, error is eliminated by locating the rolling tools in the groove.

While other variations exist, the above described designs for ring-cutting machines are typical of those encountered in the prior art. It is an objective of the present invention to provide for cutting of rings of precisely described dimensions from titanium and related materials. It is a further objective to provide such precision cutting with a minimum of waste. It is yet another objective of the invention to minimize heating of both the cutting tool and the work piece. It is still another objective to minimize any pollution produced by the cutting process. Finally, it is an objective of the invention to provide the above-described capabilities in an inexpensive and durable machine, which is capable of extended duty cycles, and that may be easily repaired and maintained.

While some of the objectives of the present invention are disclosed in the prior art, none of the inventions found include all of the requirements identified.

SUMMARY OF THE INVENTION

The present invention addresses all of the deficiencies of prior art ring cutting inventions and satisfies all of the objectives described above.

An apparatus for cutting rings from ring forgings of titanium or related materials providing the desired features may be constructed from the following components. Means for removably holding and rotating the ring forging about a longitudinal axis are provided. The longitudinal axis extends through a centerline of the ring forging. Means are provided for rotating the ring forging at at least one speed and in at least one direction. A tool holder is adjustably mounted spaced from and parallel to the axis. Means are provided for controlling a displacement of the tool holder from the means for holding the ring forging along the axis, thereby allowing an operator to determine a thickness of a ring to be cut from the ring forging. Means are provided for controlling a displacement of the tool holder from the axis to affect cutting of the ring from the ring forging.

First and second cutter bars are provided. The first and second cutter bars are removably mounted to the tool holder such that the cutter bars are positioned orthogonally with respect to the axis. The first cutter bar includes a first cutting bit. The first cutting bit has a first cutting edge of a first predetermined width. The first cutting edge is positioned to move along a diameter of the ring forging toward the axis. The second cutter bar includes a second cutting bit. The second cutting bit has a second cutting edge of a second predetermined width. The second predetermined width is wider than the first predetermined width. The second cutting edge is positioned to move along a line parallel to and spaced from the diameter. The line is coplanar with the diameter. The second cutting bit is located to engage the ring forging after the first cutting bit engages the ring forging as the first cutting edge is moved along the diameter.

In a variant of the invention, the apparatus for cutting rings from ring forgings of titanium or related materials may be constructed from the following components. A horizontal mounting surface is provided. A machine base is fixedly attached to the mounting surface. A rotating headstock is fixedly attached to the machine base. The headstock has a longitudinal axis of rotation parallel to the horizontal mounting surface. The headstock has a front face. The front face is orthogonal to the axis of rotation of the headstock. The headstock is capable of providing rotation at at least one speed and capable of providing rotation in at least one direction.

The front face is adapted to removably attach a clamping means parallel to the front face. The clamping means is capable of mounting a ring forging such that the centerline of the forging is collinear with the longitudinal axis of rotation of the rotating headstock.

A tool holder is adjustably mounted spaced from and parallel to the axis. Means are provided for controlling a displacement of the tool holder from the front face of the headstock along the axis, thereby allowing an operator to determine a thickness of a ring to be cut from the ring forging. Means are provided for controlling a displacement of the tool holder from the axis to affect cutting of the ring from the ring forging. First and second cutter bars are provided. The first and second cutter bars are removably mounted to the tool holder such that the cutter bars are positioned orthogonally with respect to the axis.

The first cutter bar includes a first cutting bit. The first cutting bit has a first cutting edge of a first predetermined width. The first cutting edge is positioned to move along a diameter of the ring forging toward the axis. The second cutter bar includes a second cutting bit. The second cutting bit has a second cutting edge of a second predetermined width. The second predetermined width is wider than the first predetermined width. The second cutting edge is positioned to move along a line parallel to and spaced from the diameter. The line is coplanar with the diameter. The second cutting bit is located to engage the ring forging after the first cutting bit engages the ring forging as the first cutting edge is moved along the diameter.

When the first cutting bit engages the ring forging as the forging is rotated toward the first cutting edge a cut of the first predetermined width will be produced. When the second cutting bit engages the forging, the cut will be widened to the second predetermined width and chips will be removed from the cut and heat produced by the first cutting bit will be reduced.

In a further variant of the invention, the clamping means is a centering three-jaw chuck. In still a further variant, the means for controlling the displacement of the tool holder from the axis further comprises a horizontal drive mechanism. The drive mechanism is capable of moving the tool holder toward the axis of rotation at at least one predetermined speed.

In another variant of the invention, each of the first and second cutter bars include a flattened rectangular bar. The bar has a first end, a second end, first and second parallel side edges, a first uniform thickness and at least one receiving notch. The receiving notch is located at either the first or second end adjacent either the first or second side edges. The receiving notch has an upper edge and a lower edge. The edges taper toward each other and terminate in a rounded release opening. The upper and lower edges have a convex profile and are sized and shaped to receive a tapered cutting bit.

At least one tapered cutting bit is provided. Each of the cutting bits has a cutting edge and upper and lower edges that taper toward each other. The upper and lower edges have a concave profile sized and shaped to fit slidably the convex profile of the upper and lower edges of the receiving notch. The first or second end of the bar is relieved so that when the cutting bit is installed in the receiving notch, the cutting edge will protrude beyond the first or second ends of the bar.

In still another variant, the tool holder includes a base. The base includes means for removably mounting the tool holder to the means for controlling a displacement of the tool holder. A tool bar mounting surface is provided. The surface is orthogonal to the base and orthogonal to the axis of rotation of the headstock. A horizontal receiving slot is located in the tool bar mounting surface and has parallel upper and lower edges. The horizontal receiving slot is sized and shaped to slidably fit the rectangular bar of the first cutter bar. The horizontal receiving slot has a depth slightly less than the first uniform thickness. The horizontal slot is located so that the first cutting edge of the first cutter bit can be moved along the diameter of the ring forging.

An angled receiving slot is provided. The angled slot is located in the tool bar mounting surface and has parallel upper and lower edges and is sized and shaped to slidably fit the rectangular bar of the second cutter bar. The angled receiving slot has a depth slightly less than the first uniform thickness. The angled slot is located so that the second cutting edge of the second cutter bit can be moved along the line parallel to and spaced from the diameter. The line is coplanar with the diameter. Means are provided for securing each of the first and second cutter bars to the tool holder.

In a final variation of the invention, the means for securing each of the first and second cutter bars to the tool holder includes at least two threaded holes penetrating the tool bar mounting surface on either side of the horizontal slot and the angled slot perpendicular to the mounting surface. At least one rigid plate is provided. The rigid plate has at least two holes located to slidably fit threaded bolts sized to fit the threaded holes. At least two bolts are provided. The bolts are sized and shaped to penetrate the holes in the rigid plate and engage the threaded holes without reaching a bottom of the threaded holes. When the first and second tool bars are located in the horizontal slot and the angled slot and the bolts penetrate the rigid plate and threadedly engage the threaded holes and are tightened, the first and second tool bars will be removably attached to the tool holder.

An appreciation of the other aims and objectives of the present invention and an understanding of it may be achieved by referring to the accompanying drawings and the detailed description of a preferred embodiment.

DETAILED DESCRIPTION OF THE PREFERRED EMBODIMENT

Figure 1:
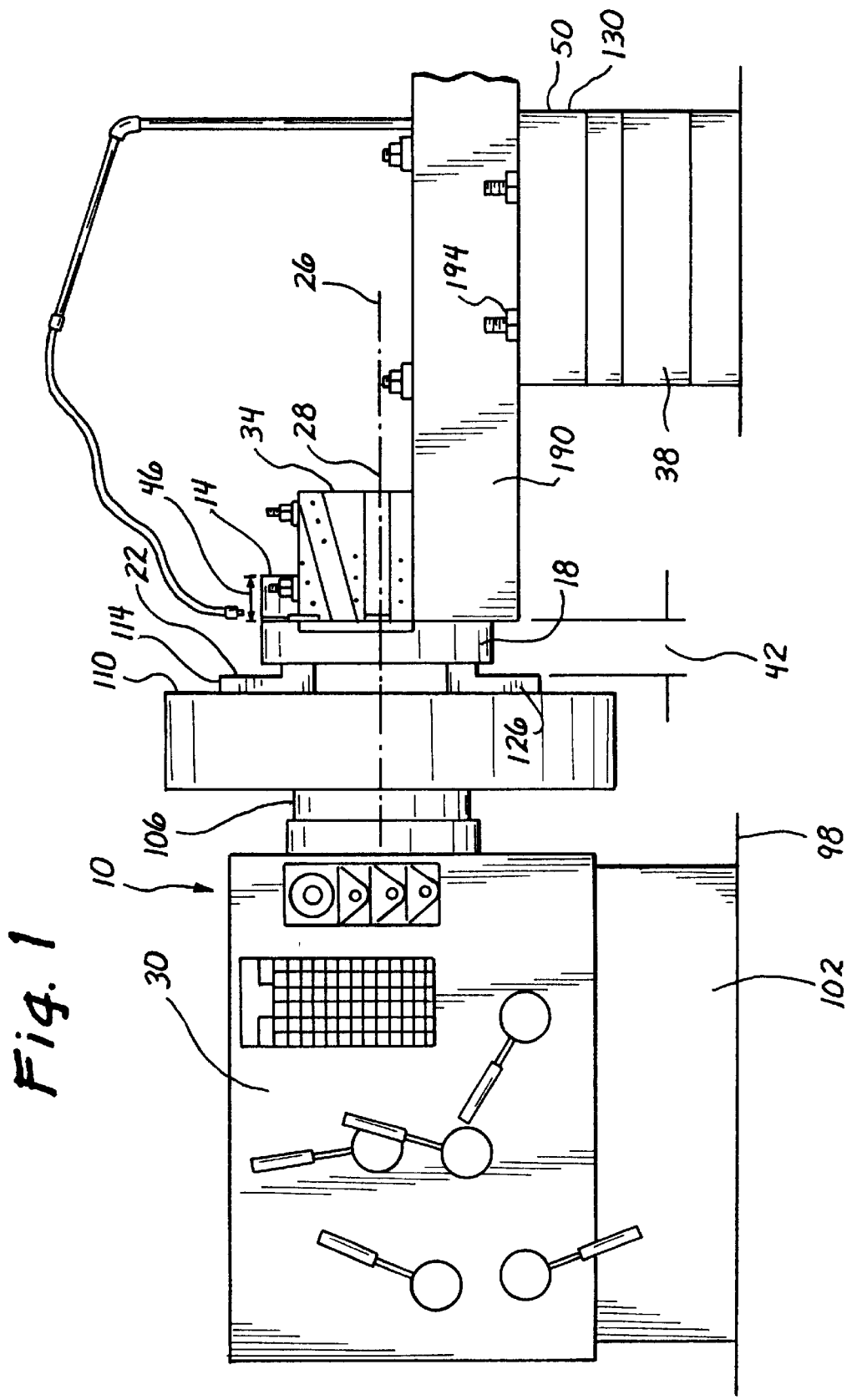
FIG. 1 is a side elevational view of the preferred embodiment of the invention.

FIGS. 1–6 illustrate an apparatus 10 for cutting rings 14 from ring forgings 18 of titanium or related materials providing the desired features that may be constructed from the following components. As illustrated in FIG. 1, means 22 for removably holding and rotating the ring forging 18 about a longitudinal axis 26 are provided. The longitudinal axis 26 extends through a centerline 28 of the ring forging 18. Means 30 are provided for rotating the ring forging 18 at at least one speed and in at least one direction. A tool holder 34 is adjustably mounted spaced from and parallel to the axis 26. Means 38 are provided for controlling a displacement 42 of the tool holder 34 from the means 22 for holding the ring forging 18 along the axis 26, thereby allowing an operator to determine a thickness 46 of a ring 14 to be cut from the ring forging 18. Means 50 are provided for controlling a displacement 54 of the tool holder 34 from the axis 26 to affect cutting of the ring 14 from the ring forging 18.

As illustrated in FIGS. 2–6, first 58 and second 62 cutter bars are provided. The first 58 and second 62 cutter bars are removably mounted to the tool holder 34 such that the cutter bars 58, 62 are positioned orthogonally with respect to the axis 26. The first cutter bar 58 includes a first cutting bit 66. The first cutting bit 66 has a first cutting edge 70 of a first predetermined width 74. The first cutting edge 70 is positioned to move along a diameter 78 of the ring forging 18 toward the axis 26. The second cutter bar 62 includes a second cutting bit 82. The second cutting bit 82 has a second cutting edge 86 of a second predetermined width 90. The second predetermined width 90 is wider than the first predetermined width 74. The second cutting edge 86 is positioned to move along a line 94 parallel to and spaced from the diameter 78. The line 94 is coplanar with the diameter 78. The second cutting bit 82 is located to engage the ring forging 18 after the first cutting bit 66 engages the ring forging 18 as the first cutting edge 70 is moved along the diameter 78.

In a variant of the invention, the apparatus 10 for cutting rings 14 from ring forgings 18 of titanium or related materials may be constructed from the following components. A horizontal mounting surface 98 is provided. A machine base 102 is fixedly attached to the mounting surface 98. A rotating headstock 106 is fixedly attached to the machine base 102. The headstock 106 has a longitudinal axis of rotation 26 parallel to the horizontal mounting surface 98. The headstock 106 has a front face 110. The front face 110 is orthogonal to the axis of rotation 26 of the headstock 106. The headstock 106 is capable of providing rotation at at least one speed and capable of providing rotation in at least one direction.

The front face 110 is adapted to removably attach a clamping means 114 parallel to the front face 110. The clamping means 114 is capable of mounting a ring forging 18 such that the centerline 28 of the forging 18 is collinear with the longitudinal axis of rotation 26 of the rotating headstock 106.

Figure 2:
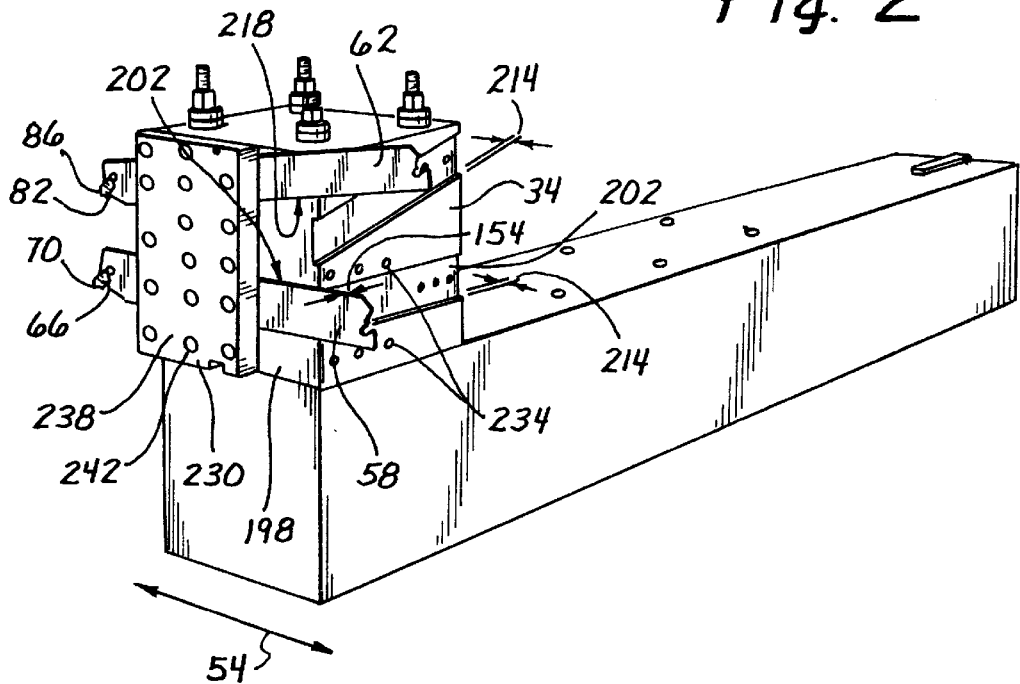
FIG. 2 is a perspective view of the tool holder of the FIG. 1 embodiment with the first and second cutter bars secured thereto.
Figure 3:
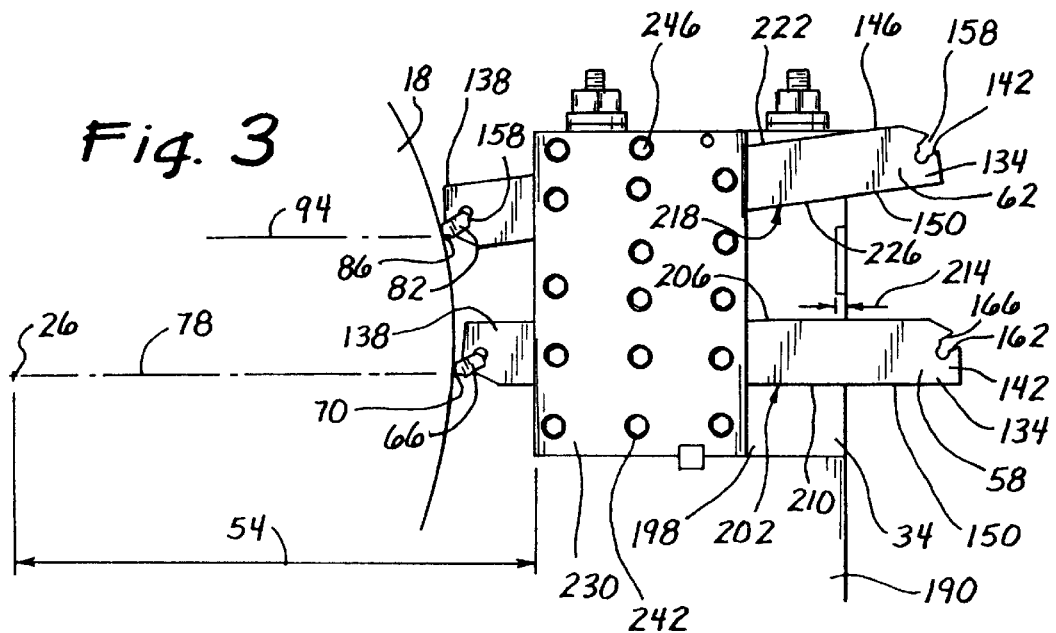
FIG. 3 is a side elevational view of the tool holder, first and second cutter bars and the first and second cutter bits engaging the rotating ring forging.
Figure 4:
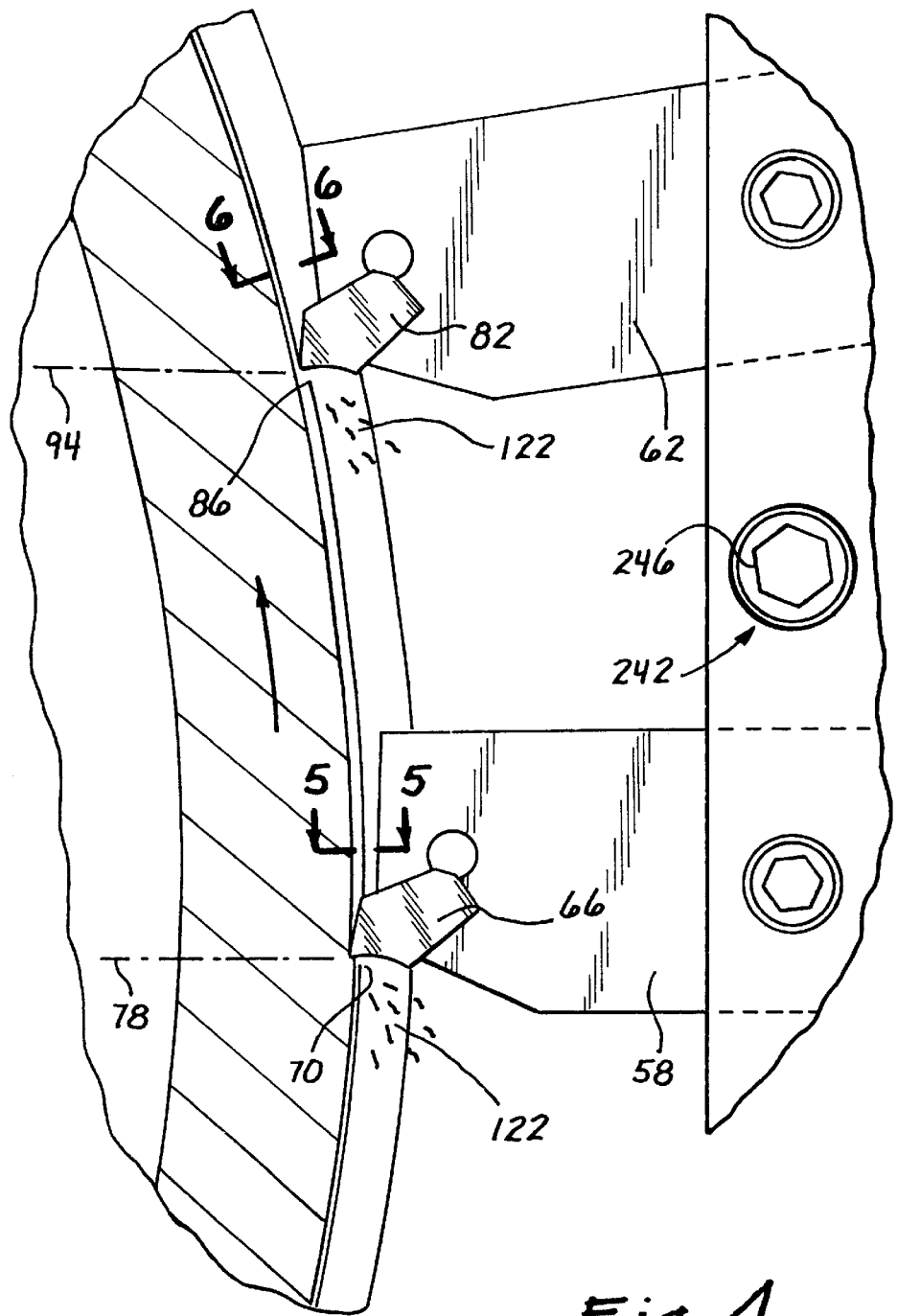
FIG. 4 is a side cross-sectional detail illustrating the first cutter bit engaging the ring forging ahead of the second cutter bit.

A tool holder 34 is adjustably mounted spaced from and parallel to the axis 26. Means 38 are provided for controlling a displacement 42 of the tool holder 34 from the front face 110 of the headstock 106 along the axis 26, thereby allowing an operator to determine a thickness 46 of a ring 14 to be cut from the ring forging 18. Means 50 are provided for controlling a displacement 54 of the tool holder 34 from the axis 26 to affect cutting of the ring 14 from the ring forging 18. As illustrated in FIGS. 2–4, first 58 and second 62 cutter bars are provided. The first 58 and second 62 cutter bars are removably mounted to the tool holder 34 such that the cutter bars 58, 62 are positioned orthogonally with respect to the axis 26.

As illustrated in FIGS. 3–6, the first cutter bar 58 includes a first cutting bit 66. The first cutting bit 66 has a first cutting edge 70 of a first predetermined width 74. The first cutting edge 70 is positioned to move along a diameter 78 of the ring forging 18 toward the axis 26. The second cutter bar 62 includes a second cutting bit 82. The second cutting bit 82 has a second cutting edge 86 of a second predetermined width 90. The second predetermined width 90 is wider than the first predetermined width 74. The second cutting edge 86 is positioned to move along a line 94 parallel to and spaced from the diameter 78. The line 94 is coplanar with the diameter 78. As illustrated in FIG. 4, the second cutting bit 82 is located to engage the ring forging 18 after the first cutting bit 66 engages the ring forging 18 as the first cutting edge 70 is moved along the diameter 78.

Figure 5:
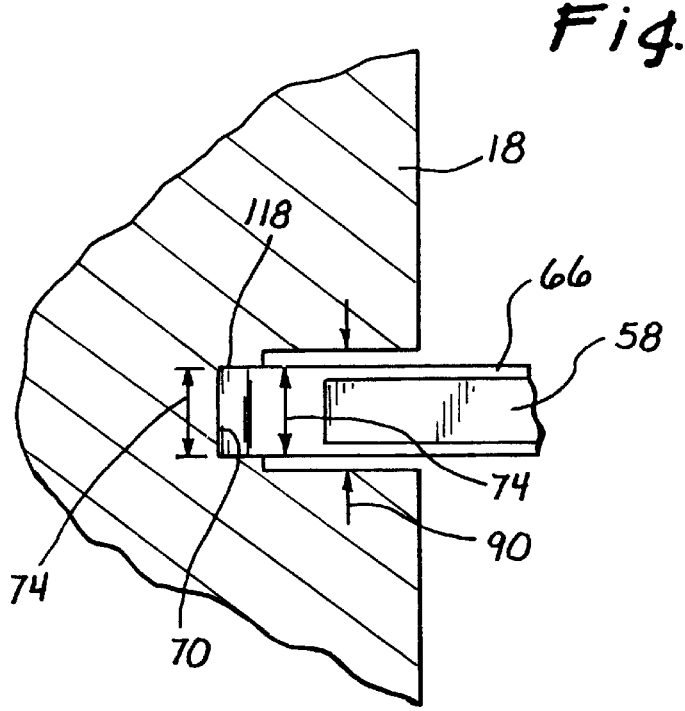
FIG. 5 is a plan view cross-sectional detail of the first cutter bit engaging the ring forging taken along the line 5—5 illustrating a cut of the first predetermined width.
Figure 6:
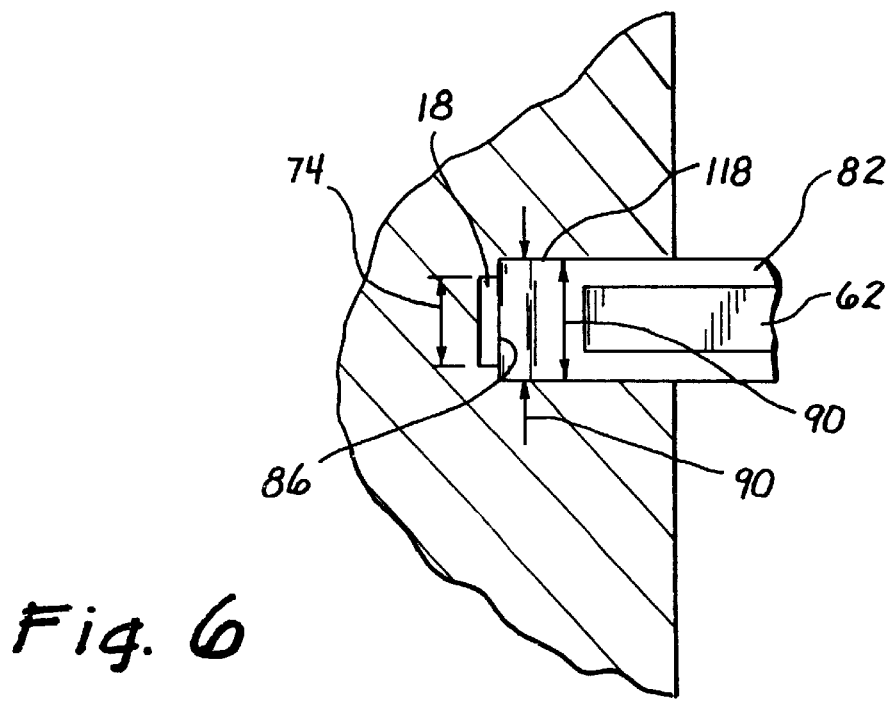
FIG. 6 is a plan view cross-sectional detail of the second cutter bit engaging the ring forging along the line 6—6 illustrating a cut of the second predetermined width.

As illustrated in FIGS. 4–6, when the first cutting bit 66 engages the ring forging 18 as the forging 18 is rotated toward the facing first cutting edge 70 a cut 118 of the first predetermined width 74 will be produced. When the second cutting bit 82 engages the forging 18, the cut 118 will be widened to the second predetermined width 90 and chips 122 will be removed from the cut 118 and heat produced by the first cutting bit 66 will be reduced.

In a further variant of the invention, as illustrated in FIGS. 1 and 2, the clamping means 114 is a centering three-jaw chuck 126. In still a further variant, the means 50 for controlling the displacement 54 of the tool holder 34 from the axis 26 further comprises a horizontal drive mechanism 130. The drive mechanism 130 is capable of moving the tool holder 34 toward the axis of rotation 26 at at least one predetermined speed.

Figure 3A:
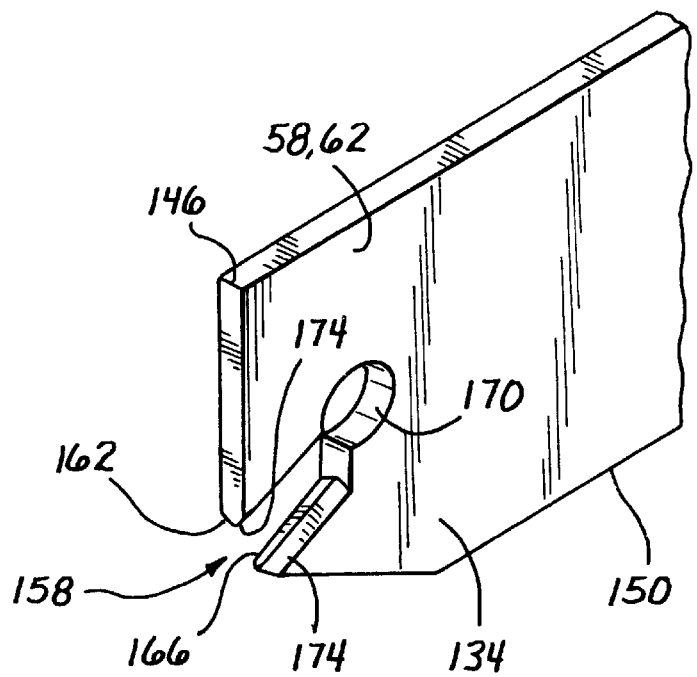
FIG. 3A is a detailed perspective view of one end of one of the cutter bars illustrating the tapered convex receiving notch for a cutter bit.

In another variant of the invention, as illustrated in FIGS. 2, 3 and 3A each of the first 58 and second 62 cutter bars include a flattened rectangular bar 134. The bar 134 has a first end 138, a second end 142, first 146 and second 150 parallel side edges, a first uniform thickness 154 and at least one receiving notch 158. The receiving notch 158 is located at either the first 138 or second 142 end adjacent either the first 146 or second 150 side edges. The receiving notch 158 has an upper edge 162 and a lower edge 166. The edges 162, 166 taper toward each other and terminate in a rounded release opening 170. The upper 162 and lower 166 edges have a convex profile 174 and are sized and shaped to receive a tapered cutting bit 66, 82.

Figure 3B:
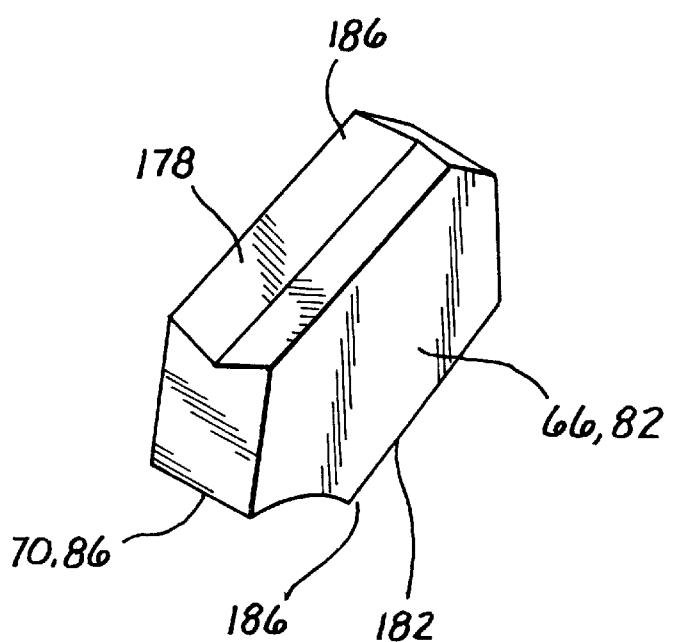
FIG. 3B is a detailed perspective view of a cutter bit illustrating its concave tapered upper and lower edges and cutting edge.

As illustrated in FIG. 3B, at least one tapered cutting bit 66, 82 is provided. Each of the cutting bits 66, 82 has a cutting edge 70, 86, upper 178 and lower 182 edges that taper toward each other. The upper 178 and lower 182 edges have a concave profile 186 sized and shaped to fit slidably the convex profile 174 of the upper 162 and lower 166 edges of the receiving notch 158. The first 138 or second 142 end of the bar 134 is relieved so that when in the cutting bit 66, 82 is installed in the receiving notch 158, the cutting edge 70, 86 will protrude beyond the first 138 or second 142 end of the bar 134.

In still another variant, as illustrated in FIGS. 1–3, the tool holder 34 includes a base 190. The base 190 includes means 194 for removably mounting the tool holder 34 to the means 38, 50 for controlling a displacement 42, 54 of the tool holder 34. A tool bar mounting surface 198 is provided. The surface 198 is orthogonal to the base 190 and orthogonal to the axis of rotation 26 of the headstock 106. A horizontal receiving slot 202 is located in the tool bar mounting surface 198 and has parallel upper 206 and lower 210 edges. The horizontal receiving slot 202 is sized and shaped to slidably fit the rectangular bar 134 of the first cutter bar 58. The horizontal receiving slot 202 has a depth 214 slightly less than the first uniform thickness 154. The horizontal slot 202 is located so that the first cutting edge 70 of the first cutter bit 66 can be moved along the diameter 78 of the ring forging 18.

An angled receiving slot 218 is provided. The angled slot 218 is located in the tool bar mounting surface 198 and has parallel upper 222 and lower 226 edges and is sized and shaped to slidably fit the rectangular bar 134 of the second cutter bar 62. The angled receiving slot 218 has a depth 214 slightly less than the first uniform thickness 154. The angled slot 218 is located so that the second cutting edge 86 of the second cutter bit 82 can be moved along the line 94 parallel to and spaced from the diameter 78. The line 94 is coplanar with the diameter 78. Means 230 are provided for securing each of the first 58 and second 62 cutter bars to the tool holder 34.

In a final variation of the invention, as illustrated in FIGS. 2–4, the means 230 for securing each of the first 58 and second 62 cutter bars to the tool holder 34 includes at least two threaded holes 234 penetrating the tool bar mounting surface 198 on either side of the horizontal slot 202 and the angled slot 218 perpendicular to the mounting surface 198. At least one rigid plate 238 is provided. The rigid plate 238 has at least two holes 242 located to slidably fit threaded bolts 246 sized to fit the threaded holes 234. At least two bolts 246 are provided. The bolts 246 are sized and shaped to penetrate the holes 242 in the rigid plate 238 and engage the threaded holes 234 without reaching a bottom (not shown) of the threaded holes 234. When the first 58 and second 62 tool bars are located in the horizontal slot 202 and the angled slot 218 and the bolts 246 penetrate the rigid plate 238 and threadedly engage the threaded holes 234 and are tightened, the first 58 and second 62 tool bars will be removably attached to the tool holder 34.

The apparatus for cutting rings from ring forgings 10 has been described with reference to particular embodiments. Other modifications and enhancements can be made without departing from the spirit and scope of the claims that follow.

What is claimed is:

1. An apparatus for cutting rings from ring forgings of either of titanium and related materials, comprising:

means for removably holding and rotating said ring forging about a longitudinal axis, said axis extending through a centerline of the ring forging;

means for rotating said ring forging at at least one speed and in at least one direction;

a tool holder adjustably mounted spaced from and parallel to said axis;

means for controlling a displacement of the tool holder from the means for holding the ring forging along said axis, thereby allowing an operator to determine a thickness of a ring to be cut from the ring forging;

means for controlling a displacement of the tool holder from said axis to affect cutting of the ring from the ring forging;

first and second cutter bars, said first and second cutter bars being removably mounted to said tool holder such that said cutter bars are positioned orthogonally with respect to said axis;

said first cutter bar including a first cutting bit, said first cutting bit having a first cutting edge of a first predetermined width, said first cutting edge being positioned to move along a diameter of the ring forging toward said axis;

said second cutter bar including a second cutting bit, said second cutting bit having a second cutting edge of a second predetermined width, said second predetermined width being wider than said first predetermined width, said second cutting edge being positioned to move along a line parallel to and spaced from said diameter, said line being coplanar with said diameter; and said second cutting bit being disposed to engage said ring forging after said first cutting bit engages said ring forging as said first cutting edge is moved along said diameter.

2. An apparatus for cutting rings from ring forgings of either of titanium and related materials, comprising:

a horizontal mounting surface;

a machine base fixedly attached to the mounting surface;

a rotating headstock fixedly attached to said machine base and having a longitudinal axis of rotation parallel to the horizontal mounting surface;

said headstock having a front face, said front face being orthogonal to the axis of rotation of the headstock;

said headstock capable of providing rotation at at least one speed and capable of providing rotation in at least one direction;

said front face adapted to removably attach a clamping means parallel to the front face, said clamping means being capable of mounting a ring forging such that the centerline of the forging is collinear with the longitudinal axis of rotation of the rotating headstock;

a tool holder adjustably mounted spaced from and parallel to said axis;

means for controlling a displacement of said tool holder from the front face of the headstock along said axis, thereby allowing an operator to determine a thickness of a ring to be cut from the ring forging;

means for controlling a displacement of the tool holder from said axis to affect cutting of the ring from the ring forging;

first and second cutter bars, said first and second cutter bars being removably mounted to said tool holder such that said cutter bars are positioned orthogonally with respect to said axis;

said first cutter bar including a first cutting bit, said first cutting bit having a first cutting edge of a first predetermined width, said first cutting edge being positioned to move along a diameter of the ring forging toward said axis;

said second cutter bar including a second cutting bit, said second cutting bit having a second cutting edge of a second predetermined width, said second predetermined width being wider than said first predetermined width, said second cutting edge being positioned to move along a line parallel to and spaced from said diameter, said line being coplanar with said diameter;

said second cutting bit being disposed to engage said ring forging after said first cutting bit engages said ring forging as said first cutting edge is moved along said diameter; and whereby, when said first cutting bit engages the ring forging as said forging is rotated toward the first cutting edge a cut of the first predetermined width will be produced, and when said second cutting bit engages said forging, the cut will be widened to the second predetermined width, chips will be removed from the cut and heat produced by said first cutting bit will be reduced.

3. An apparatus for cutting rings from ring forgings of either of titanium and related materials as described in claim 2, wherein the clamping means is a centering three-jaw chuck.

4. An apparatus for cutting rings from ring forgings of either of titanium and related materials as described in claim 2, wherein the means for controlling the displacement of the tool holder from said axis further comprises a horizontal drive mechanism, said drive mechanism being capable of moving the tool holder toward the axis of rotation at at least one predetermined speed.

5. An apparatus for cutting rings from ring forgings of either of titanium and related materials as described in claim 2, wherein each of the first and second cutter bars further comprise:

a flattened rectangular bar, said bar having a first end, a second end, first and second parallel side edges, a first uniform thickness and at least one receiving notch;

said receiving notch being disposed at either of the first and second end adjacent either of the first and second side edges;

said receiving notch having an upper edge and a lower edge, said edges tapering toward each other and terminating in a rounded release opening;

said upper and lower edges having a convex profile and being sized and shaped to receive a tapered cutting bit;

at least one tapered cutting bit, each of said cutting bits having a cutting edge, upper and lower edges tapering toward each other and having a concave profile sized and shaped to fit slidably the convex profile of the upper and lower edges of the receiving notch; and either of the first and second end of the bar being relieved so that when the cutting bit is installed in the receiving slot, the cutting edge will protrude beyond either of the first and second ends of the bar.

6. An apparatus for cutting rings from ring forgings of either of titanium and related materials as described in claim 5, wherein the tool holder further comprises:

a base, said base including means for removably mounting the tool holder to the means for controlling a displacement of said tool holder;

a tool bar mounting surface, said surface being orthogonal to said base and orthogonal to the axis of rotation of the headstock;

a horizontal receiving slot, said horizontal slot being disposed in said tool bar mounting surface and having parallel upper and lower edges and being sized and shaped to slidably fit the rectangular bar of the first cutter bar;

said horizontal receiving slot having a depth slightly less than said first uniform thickness;

said horizontal slot being disposed so that the first cutting edge of the first cutter bit can be moved along a diameter of the ring forging;

an angled receiving slot, said angled slot being disposed in said tool bar mounting surface and having parallel upper and lower edges and being sized and shaped to slidably fit the rectangular bar of the second cutter bar;

said angled receiving slot having a depth slightly less than said first uniform thickness;

said angled slot being disposed so that the second cutting edge of the second cutter bit can be moved along a line parallel to and spaced from said diameter, said line being coplanar with said diameter;

means for securing each of the first and second cutter bars to the tool holder.

7. An apparatus for cutting rings from ring forgings of either of titanium and related materials as described in claim 6, wherein the means for securing each of the first and second cutter bars to the tool holder further comprises:

at least two threaded holes penetrating said tool bar mounting surface on either side of said horizontal slot and said angled slot perpendicular to said mounting surface;

at least one rigid plate, said rigid plate have at least two holes disposed to slidably fit threaded bolts sized to fit said threaded holes;

at least two bolts, said bolts being sized and shaped to penetrate the holes in the rigid plate and engage said threaded holes without reaching a bottom of said threaded holes; and whereby, when said first and second tool bars are disposed in said horizontal slot and said angled slot and said bolts penetrate said rigid plate and threadedly engage said threaded holes and are tightened therewithin, the first and second tool bars will be removably attached to said tool holder.

8. A method for cutting rings from ring forgings of either of titanium and related materials, comprising:

providing means for removably holding and rotating said ring forging about a longitudinal axis, said axis extending through a centerline of the ring forging;

rotating said ring forging at at least one speed and in at least one direction;

providing a tool holder adjustably mounted spaced from and parallel to said axis;

controlling a displacement of the tool holder from the means for holding the ring forging along said axis, thereby allowing an operator to determine a thickness of a ring to be cut from the ring forging;

controlling a displacement of the tool holder from said axis to affect cutting of the ring from the ring forging;

providing first and second cutter bars, said first and second cutter bars being removably mounted to said tool holder such that said cutter bars are positioned orthogonally with respect to said axis;

said first cutter bar including a first cutting bit, said first cutting bit having a first cutting edge of a first predetermined width;

moving said first cutting edge along a diameter of the ring forgings toward said axis;

said second cutter bar including a second cutting bit, said second cutting bit having a second cutting edge of a second predetermined width, said second predetermined width being wider than said first predetermined width;

moving said second cutting edge along a line parallel to and spaced from said diameter, said line being coplanar with said diameter; and engaging said ring forging with said second cutting bit after said first cutting bit engages said ring forging as said first cutting edge is moved along said diameter.

\* \* \* \* \*